(12) United States Patent
Viering et al.

(10) Patent No.: US 12,284,565 B2
(45) Date of Patent: Apr. 22, 2025

(54) RRC RECONFIGURATIONS DURING CONDITIONAL HANDOVER

(71) Applicant: NOKIA TECHNOLOGIES OY, Espoo (FI)

(72) Inventors: Ingo Viering, Munich (DE); Krzysztof Kordybach, Pulawy (PL); Guillaume Decarreau, Munich (DE); Jedrzej Stanczak, Wroclaw (PL); Ahmad Awada, Munich (DE); Srinivasan Selvaganapathy, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 555 days.

(21) Appl. No.: 17/621,404

(22) PCT Filed: Jun. 29, 2020

(86) PCT No.: PCT/EP2020/068277
§ 371 (c)(1),
(2) Date: Dec. 21, 2021

(87) PCT Pub. No.: WO2020/260704
PCT Pub. Date: Dec. 30, 2020

(65) Prior Publication Data
US 2022/0361055 A1 Nov. 10, 2022

(30) Foreign Application Priority Data
Jun. 27, 2019 (WO) .................. PCT/EP2019/067103
Apr. 8, 2020 (IN) .............................. 202044015487

(51) Int. Cl.
*H04W 36/38* (2009.01)
*H04W 36/00* (2009.01)
*H04W 36/36* (2009.01)

(52) U.S. Cl.
CPC ....... *H04W 36/38* (2013.01); *H04W 36/0064* (2023.05); *H04W 36/00838* (2023.05); *H04W 36/362* (2023.05)

(58) Field of Classification Search
CPC ............. H04W 36/0064; H04W 36/38; H04W 36/00838; H04W 36/362; H04W 36/0058
See application file for complete search history.

(56) References Cited

U.S. PATENT DOCUMENTS

| 2017/0070925 A1 | 3/2017 | Hole |
| 2018/0279193 A1 | 9/2018 | Park et al. |

(Continued)

FOREIGN PATENT DOCUMENTS

| CN | 101635968 A | 1/2010 |
| CN | 107770828 A | 3/2018 |

(Continued)

OTHER PUBLICATIONS

U.S. Appl. No. 62/805,403, "Semi-Persistent Transmission Timing Adaptation Based on Application Clock Shifts", filed Feb. 14, 2019, pp. 1-47.

(Continued)

*Primary Examiner* — Kiet Tang
(74) *Attorney, Agent, or Firm* — Lippes Mathias LLP

(57) ABSTRACT

It is provided a method comprising: checking if an indication indicates that a target cell is configured to store concurrently first and second configurations of a terminal, wherein the first configuration is based on a first conditional handover request, and the second configuration data set is based on a second conditional handover request; monitoring if the source cell intends performing a radio reconfiguration of the terminal after the source cell configured the terminal for the first conditional handover; canceling the first conditional handover if the source cell intends performing the (Continued)

radio reconfiguration and the indication does not indicate the concurrently storing; instructing the source cell to request the second conditional handover from the target cell if the source cell intends performing the radio reconfiguration and the indication indicates the concurrently storing.

12 Claims, 10 Drawing Sheets

(56) References Cited

U.S. PATENT DOCUMENTS

| | | | | |
|---|---|---|---|---|
| 2020/0351734 | A1* | 11/2020 | Purkayastha | ..... H04W 36/0094 |
| 2021/0360495 | A1* | 11/2021 | Lovlekar | ........... H04W 36/0094 |

FOREIGN PATENT DOCUMENTS

| | | |
|---|---|---|
| CN | 109474962 A | 3/2019 |
| WO | WO 2018/132051 A1 | 7/2018 |
| WO | 2018/144523 A1 | 8/2018 |
| WO | 2018/156696 A1 | 8/2018 |
| WO | 2018/172600 A1 | 9/2018 |
| WO | WO 2019/096396 A1 | 5/2019 |

OTHER PUBLICATIONS

"3rd Generation Partnership Project; Technical Specification Group Radio Access Network; NR; User Equipment (UE) radio transmission and reception; Part 1: Range 1 Standalone (Release 15)", 3GPP TS 38.101-1, V15.4.0, Dec. 2018, pp. 1-230.

"New WID: Support of NR Industrial Internet of Things (Iot)", 3GPP TSG RAN Meeting #83, RP-190728, Agenda: 9.1.2, Nokia, Mar. 18-21, 2019, 6 pages.

"New WID: Physical Layer Enhancements for NR Ultra-Reliable and Low Latency Communication (URLLC)", 3GPP TSG RAN Meeting #83, RP-190726, Agenda: 9.1.1, Huawei, Mar. 18-21, 2019, 5 pages.

International Search Report and Written Opinion received for corresponding Patent Cooperation Treaty Application No. PCT/EP2019/058850, dated Dec. 13, 2019, 12 pages.

Office action received for corresponding European Patent Application No. 19717462.6, dated Feb. 8, 2024, 8 pages.

Henrik Martikainen et al., "On the Basics of Conditional Handover for 5G Mobility," 2018 IEEE 29th Annual International Symposium on Personal, Indoor, and Mobile Radio Communications (PIMRC), Bologna, Italy, Sep. 2018.

International Search Report and Written Opinion dated Sep. 24, 2020 corresponding to International Patent Application No. PCT/EP2020/068277.

Ericsson, "CHO Preparation—Summary of offline discussion,"—3GPP Draft; R3-201159, 3GPP TSG-RAN WG3 meeting #107-e, E-meeting, Mar. 8, 2020, XP051861490.

CATT, "Further Consideration on CHO preparation Procedure," 3GPP Draft; R3-200529, 3GPP TSG-RAN WG3 #107-3, Online, Feb. 15, 2020, XP051854527.

Nokia et al., "(TP for NR_Mob_enh BL CR for TS 38.423): Completion of the open points related to the modification of a CHO," 3GPP Draft; R3-201654, 3GPP TSG-RAN WG3 Meeting #107-bis-e, E-meeting, Apr. 9, 2020, XP051870479.

RAN3 Chairman, "List of E-mail Discussions", 3GPP Draft; R3-202552, 3GPP TSG-RAN WG3 #107bis-e, Online, May 4, 2020, XP051880757.

China Telecom et al., "New Work Item on even further Mobility enhancement in E-UTRAN," 3GPP Draft; RP-181337, 3GPP TSG RAN Meeting #80, La Jolla, CA, USA, Jun. 11-14, 2018.

Intel Corporation, "New WID: NR mobility enhancements," 3GPP Draft; RP-181433, 3GPP TSG RAN Meeting #80, La Jolla, CA, May 21-25, 2018.

International Search Report and Written Opinion dated Mar. 31, 2020 corresponding to International Patent Application No. PCT/EP2019/067103.

Nokia et al., "Further details of Baseline Conditional Handover in E-UTRAN," 3GPP Draft; R2-1904286, 3GPP TSG-RAN WG2 Meeting #105bis, Xian, China, Mar. 28, 2019, XP051693508.

Nokia et al., "Configuration Management for Conditional Handover," 3GPP Draft, R2-1803347, 3GPP TSG-RAN WG2 Meeting #101, Athens, Greece, Feb. 16, 2018, XP051400479.

Qualcomm Incorporated, "LTE Conditional HO design considerations," 3GPP Draft; R2-1906375, 3GPP TSG-RAN WG2 Meeting #106, Reno, USA, May 13, 2019, XP051729840.

"Msc-generator", Sourceforge, Retrieved on Mar. 27, 2024, Webpage available at :https://sourceforge.net/projects/msc-generator/.

"3rd Generation Partnership Project; Technical Specification Group Radio Access Network; Evolved Universal Terrestrial Radio Access Network (E-UTRAN); X2 application protocol (X2AP) (Release 16)", 3GPP TS 36.423, V16.0.0, Dec. 2019, pp. 1-432.

"3rd Generation Partnership Project; Technical Specification Group Radio Access Network; NG-RAN; Xn application protocol (XnAP) (Release 16)", 3GPP TS 38.423, V16.0.0, Dec. 2019, pp. 1-330.

"3rd Generation Partnership Project; Technical Specification Group Radio Access Network; NR; NR and NG-RAN Overall Description; Stage 2 (Release 16)", 3GPP TS 38.300, V16.0.0, Dec. 2019, pp. 1-101.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.0.0, Dec. 2019, pp. 1-366.

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.0.0, Dec. 2019, pp. 1-72.

"3GPP_TSG_RAN_WG3 Archives", ETSI, Retrieved on Mar. 27, 2024, Webpage available at :https://list.etsi.org/scripts/wa.exe?A2=ind2002D&L=3GPP_TSG_RAN_WG3&O=D&P=985826.

Office action received for corresponding Indian Patent Application No. 202044015487, dated Oct. 12, 2023, 6 pages.

Office action received for corresponding Chinese Patent Application No. 202080053838.0, dated Jan. 24, 2024, 6 pages of office action and No. page of translation available.

"Conditional Handover in E-UTRAN—simultaneous expiry, timers and RRC configuration", 3GPP TSG-RAN WG2 Meeting #106, R2-1907275, Agenda: 12.3.3.1, Nokia, May 13-17, 2019, 3 pages.

"Configuration of Conditional handover in LTE", 3GPP TSG RAN WG2 #106, R2-1906195, Agenda: 12.3.3.2, Ericsson, May 13-17, 2019, pp. 1-5.

Notice of Allowance received for corresponding Chinese Patent Application No. 202080053838.0, dated May 27, 2024, 4 pages.

Notice of Allowance received for corresponding European Patent Application No. 20734241.1, dated Jun. 21, 2024, 8 pages.

* cited by examiner

RRC RECONFIGURATIONS DURING CONDITIONAL HANDOVER

FIELD OF THE INVENTION

The present invention relates to conditional handover. In particular, it relates to RRC reconfigurations during conditional handover, i.e. before the condition of the conditional handover is expired.

ABBREVIATIONS

3GPP 3$^{rd}$ Generation Partnership Project
3G/4G/5G 3$^{rd}$/4$^{th}$/5$^{th}$ Generation
ACK Acknowledge
BS Base Station
CFRA Contention-free Random Access
CHO Conditional Handover
C-RNTI Cell Radio Network Temporary Identity
eNB evolved NodeB
E-UTRA Evolved-Universal Terrestrial Radio Access
E-UTRAN E-UTRA Network
gNB next generation NodeB
HO Handover
LTE Long Term Evolution
MTC Machine Type Communication
NR New Radio
OAM Operations and Management
RACH Random Access Channel
REQ Request
RF Radio Frequency
RRC Radio Resource Control
RRM Radio Resource Management
TS Technical Specification
UE User Equipment

BACKGROUND OF THE INVENTION

"Conditional Handover" (CHO) is currently being discussed for improving the mobility robustness in two work items for mobility enhancements in LTE [1] and NR [2].

The CHO is similar to the legacy handover, and a message sequence chart for CHO is shown in FIG. 1. The CHO Request and CHO Request Acknowledgment may be the same as a HO Request and a HO Request Acknowledgment. The first steps ("Phase 1") are identical to the legacy handover. A configured event triggers the UE to send a measurement report. Based on this report, the source cell typically prepares the target cell (or multiple candidate target cells) for the handover (Handover Request+Handover Request Acknowledgement). The handover request comprises information on the configuration of the terminal, and the target cell derives and stores a set of configuration data of the terminal from the information contained in the handover request. Furthermore, based on the set of configuration data, the target cell prepares a CHO configuration which is contained in the handover request acknowledgment to the source cell. Then, the source cell sends a (conditional) handover command to the UE which comprises the CHO configuration. However, note that it is up to the network when to decide to use CHO: It is entirely possible that network chooses to configure UE with CHO command even without any measurement reports, e.g. in cases where the deployments are uniform.

For the legacy HO, the UE immediately accesses the target cell to complete the handover. For CHO, the UE will access the target cell once an additional CHO execution condition expires. The condition is typically configured, e.g. by the source cell during HO Command (details are still awaiting 3GPP decisions).

The advantage of the CHO compared to conventional (unconditional) HO is that the HO command can be sent very early, when the UE is still safe in the source cell, without risking the access into and the stability of the target cell. More details on the CHO can be found in e.g. [3].

The HO Command is generated by the target cell and included into the "Handover Request Acknowledgement" sent from target cell to source cell. The source cell then packages the HO command to RRC message and sends it to the UE via RRC signalling. 3GPP RAN2 has agreed that CHO can be configured for multiple target cells at the same time, i.e. there might be multiple target cells configured as CHO command for a UE at the same time ("prepared cell list" in FIG. 1).

The UE stays in the source cell for an uncertain period of time until the CHO condition expires, after the CHO for a certain candidate target cell has been configured in phase 1. During this period of uncertainty (i.e. when UE is configured with CHO but has not yet executed any CHO command; that is, between phase 1 and phase 2 in FIG. 1), it may happen that the source cell has to reconfigure the UE, e.g. to change RRC radio parameters, modify the radio bearers or configure CHO to other target cells. 3GPP RAN2 has agreed that the source cell remains responsible for RRC configuration, so the source cell is allowed to reconfigure the UE as long as the UE does not complete the HO into the target cell (i.e. RRC Connection Reconfiguration Complete message in case of E-UTRAN).

However, any CHO target cell knows the UE configuration that it agreed to handle when the CHO was initially configured. A later (intermediate between the triggering of CHO and handover execution) RRC reconfiguration may lead to inconsistencies during the execution of the handover, since the UE may have a different RRC configuration than that assumed by the target cell (i.e. the configuration data set stored by the target cell). There is a case where such intermediate reconfiguration does not cause any problems: if the CHO uses full configuration (which is an RRC option where the entire UE RRC context is first cleared and then (re)configured from scratch). However, a lot of signalling is required in this case.

The following solutions have already been mentioned in 3GPP contributions:

Option 1: RRC Reconfiguration without Notifying the Target Cell

The source cell may decide that an RRC reconfiguration of the UE is executed directly without notifying the target cell at all. This is illustrated in FIG. 2. The actions are as follows:
1. The CHO starts with source gNB sending a Handover Request to the target gNB for a conditional handover.
2. The target gNB responds by sending a Handover Request Acknowledgement containing the CHO configuration (cho-config) which has been created by the target gNB.
3. The source gNB sends the cho-config along with the CHO execution event/condition to the UE in an RRC reconfiguration. The UE will execute the handover when the execution event triggers which may be considerable time after.
4. During this time, Source gNB may decide to reconfigure the UE.

5. As mentioned above, source gNB may decide to execute the reconfiguration immediately. The source gNB should do that if the reconfiguration does not affect the target cell, e.g. when a radio parameter in the source cell is changed (for instance power control parameter P0).

A message sequence chart for this option is given in FIG. 3.

1. The CHO is prepared for the UE, corresponding to steps 1 to 3 of FIG. 2 (in the example of FIG. 3, two CHOs to Target eNB1 and Target eNB2 are prepared).
2. Then, source eNB decides to reconfigure the UE.
3. Source eNB reconfigures the UE.
4. After the reconfiguration, the CHO execution event triggers a HO to target eNB1.
5. UE performs the HO on the RACH of target eNB1.

As shown in FIG. 3, the CHO is safely executed when the execution event triggers a handover for one of the target eNBs, despite the RRC reconfiguration. Whether or not the execution is save depends on the type of RRC reconfiguration. If the RRC reconfiguration does affect the target cell (e.g. bearer modifications), then the source gNB shall not directly perform the reconfiguration with the UE, since the CHO execution would fail when the target gNB still has the old configuration.

Option 2: Cancel CHO and Re-Initiate CHO

In order to solve the problem of RRC reconfiguration affecting the target cell, according to some proposals, the source gNB cancels the CHO first inside the UE. Then, source gNB reconfigures the UE. Thereafter, the source gNB sends new Conditional Handover Request(s) to the target gNB(s) comprising the UE configuration after the RRC reconfiguration. The current assumption in 3GPP is that such a new Handover Request will replace the former UE configuration in the target gNBs. Option 2 makes sure that the UE and the target cell have consistent RRC configurations whenever the UE executes the handover. This is the safest method from the configuration consistency point of view.

The actions of Option 2 are shown in the message sequence chart of FIG. 4:

1. CHO preparation corresponding to step 1 of FIG. 3.
2. Source gNB decides to reconfigure UE, corresponding to step 2 of FIG. 3.
3. The source gNB cancels the CHO inside the UE
4.+5. Source gNB sends new Handover Request to target gNB(s) (i.e. modifies/replaces the UE configuration in the target gNB(s)). The new HO request comprises new information on the configuration of the UE after the decided RRC reconfiguration. This has already been agreed in RAN2.

The current assumption is that the target gNB will delete the original configuration, i.e. the source gNB assumes that the target gNB will replace the stored old UE configuration immediately.

6+7. The target gNB(s) send the Handover Request Acknowledgement to the source gNB (containing their new cho-config).
8. The source gNB sends the cho-config along with the CHO execution condition to the UE and reconfigures the UE, as decided in step 2.

FIG. 5 shows the same scenario for a single target cell, wherein the CHO preparation (step 1 of FIG. 4) is depicted in detail (steps 1 to 3 of FIG. 5).

Option 3: Modifying CHO Via HO REQ without Cancellation

Such a method is illustrated in FIG. 6.

1. Again, first 4 steps until the decision to reconfigure the UE are identical with Options 1 and 2 (FIG. 2 and FIG. 5).
5. According to Option 3, the source gNB does not cancel the CHO inside the UE, but directly modifies the CHO by sending a new Handover Request to the target gNB. The new handover request comprises information on the configuration of the UE after the decided reconfiguration.
6. As discussed beforehand, with today's assumptions, the target will replace the stored UE configuration data, i.e. delete the old one.
7. The target gNB sends the Handover Request Acknowledgement to the source gNB (containing the new cho-config).
8. The source gNB sends the cho-config along with the CHO execution condition to the UE.

Option 3.1: Target qNB Keeps Old Configuration

It has already been proposed and discussed earlier (e.g. [6]), but also recently [4, section 2.2], that the target gNB does not delete the original (old) UE configuration data in step 6 in FIG. 5, but keeps the old UE configuration data in addition to the new UE configuration data. So, the UE can access the target cell with either the old or the new configuration, the target cell is prepared for both. However, the target cell has to identify during random access (using RACH), which configuration to use. Solutions have been proposed as well:

In [6], the present inventors proposed that the target gNB tags the old and the new UE configuration data, and the UE uses the tag identifier during the RACH phase.

In the 3GPP discussions, it was also proposed that the target gNB uses different UE identifiers (e.g. C-RNTI) [5], or different contention-free random access (CFRA) resources for tagging.

Some companies claim that this can be implemented in a vendor-specific way without any standardization (in particular if C-RNTI and CFRA is used for tagging). Unfortunately, the current agreements say that the target gNB shall remove (i.e. delete) the old UE configuration data before it even starts the admission procedure for the modified CHO configuration. Therefore, the source cell cannot assume that the target gNB stores both UE configuration data sets and thereby has to cancel the CHO as described above.

[7]proposes a categorization of the RRC reconfigurations into several groups of RRC reconfigurations. For every group of RRC reconfiguration, a different set of actions is defined for the source gNB, how to execute the RRC reconfiguration. In one embodiment, the categorization is done by the target gNB using the Handover Request Acknowledgement.

REFERENCES

[1] RP-181337, New Work Item on even further Mobility enhancement in E-UTRAN, 3GPP TSG RAN Meeting #80, La Jolla, CA, USA, 11th-14th June 2018.
[2] RP-181433, New WID: NR mobility enhancements, 3GPP TSG RAN Meeting #80,La Jolla, USA, May 21-May 25, 2018.

[3] H. Martikainen, I. Viering, A. Lobinger, T. Jokela, "On the Basics of Conditional Handover for 5G Mobility," IEEE International Symposium on Personal, Indoor and Mobile Radio Communications (PIMRC) 2018, Bologna, Italy, September 2018.

[4] R3-201159, CHO Preparation—Summary of offline discussion, 3GPP TSG-RAN WG3 Meeting #107-e, 24 February-6 Mar. 2020.

[5] Email discussion "CB: #88_Email088-MobEnh_CHO_common_CHOprep", https://list.etsi.org/scripts/wa.exe?A2=ind2002D&L=3GPP_TSG_RAN_WG3&O=D&P=98582 6, March 2020.

[6] WO 2019/096396: UE context information for conditional handover, 13.10.2017

[7] PCT/EP2019/067103

SUMMARY OF THE INVENTION

It is an object of the present invention to improve the prior art.

According to a first aspect of the invention, there is provided an apparatus comprising: one or more processors, and memory storing instructions that, when executed by the one or more processors, cause the apparatus to check if an indication indicates that a target cell is configured to store concurrently a first configuration data set of a terminal and a second configuration data set of the terminal, wherein the first configuration data set is based on information on a first configuration of the terminal contained in a first conditional handover request for the terminal from a source cell to the target cell, and the second configuration data set is based on information on a second configuration of the terminal contained in a second conditional handover request for the terminal from the source cell to the target cell; monitor if the source cell intends performing a radio reconfiguration of the terminal from the first configuration to the second configuration after the source cell configured the terminal for the first conditional handover; cancel the first conditional handover in the terminal if the source cell intends performing the radio reconfiguration and the indication does not indicate that the target cell is configured to store concurrently the first configuration data set and the second configuration data set; instruct the source cell to request the second conditional handover from the target cell if the source cell intends performing the radio reconfiguration and the indication indicates that the target cell is configured to store concurrently the first configuration and the second configuration.

According to a second aspect of the invention, there is provided an apparatus comprising: one or more processors, and memory storing instructions that, when executed by the one or more processors, cause the apparatus to check if a source cell is informed that a target cell is configured to store concurrently a first configuration data set of a terminal and a second configuration data set of the terminal, wherein the first configuration data set is based on information on a first configuration of the terminal contained in a first conditional handover request for the terminal from the source cell to the target cell, and the second configuration data set is based on information on a second configuration of the terminal contained in a second conditional handover request for the terminal from the source cell to the target cell; monitor if the second conditional handover request for the terminal is received after the first conditional handover request for the terminal has been received; store the second configuration data set concurrently with the first configuration data set if the source cell is informed that the target cell is configured to store concurrently the first configuration data set and the second configuration data set and the second conditional handover request is received after the first conditional handover request has been received; overwrite the stored first configuration data set by the second configuration data set if the source cell is not informed that the target cell is configured to store concurrently the first configuration data set and the second configuration data set and the second conditional handover request is received after the first conditional handover request has been received.

According to a third aspect of the invention, there is provided a method comprising: checking if an indication indicates that a target cell is configured to store concurrently a first configuration data set of a terminal and a second configuration data set of the terminal, wherein the first configuration data set is based on information on a first configuration of the terminal contained in a first conditional handover request for the terminal from a source cell to the target cell, and the second configuration data set is based on information on a second configuration of the terminal contained in a second conditional handover request for the terminal from the source cell to the target cell; monitoring if the source cell intends performing a radio reconfiguration of the terminal from the first configuration to the second configuration after the source cell configured the terminal for the first conditional handover; canceling the first conditional handover in the terminal if the source cell intends performing the radio reconfiguration and the indication does not indicate that the target cell is configured to store concurrently the first configuration data set and the second configuration data set; instructing the source cell to request the second conditional handover from the target cell if the source cell intends performing the radio reconfiguration and the indication indicates that the target cell is configured to store concurrently the first configuration and the second configuration.

According to a fourth aspect of the invention, there is provided a method comprising: checking if a source cell is informed that a target cell is configured to store concurrently a first configuration data set of a terminal and a second configuration data set of the terminal, wherein the first configuration data set is based on information on a first configuration of the terminal contained in a first conditional handover request for the terminal from the source cell to the target cell, and the second configuration data set is based on information on a second configuration of the terminal contained in a second conditional handover request for the terminal from the source cell to the target cell; monitoring if the second conditional handover request for the terminal is received after the first conditional handover request for the terminal has been received; storing the second configuration data set concurrently with the first configuration data set if the source cell is informed that the target cell is configured to store concurrently the first configuration data set and the second configuration data set and the second conditional handover request is received after the first conditional handover request has been received; overwriting the stored first configuration data set by the second configuration data set if the source cell is not informed that the target cell is configured to store concurrently the first configuration data set and the second configuration data set and the second conditional handover request is received after the first conditional handover request has been received.

Each of the methods of the third and fourth aspects may be a method for conditional handover.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the invention, at least one of the following advantages may be achieved:
Allows RRC reconfigurations after CHO was prepared, while keeping the UE protected (i.e. avoiding failures due to cancelled CHO),
Unnecessary radio signaling between source cell and UE may be avoided;
Unnecessary delay in RRC reconfigurations of UE may be avoided;
Capability of the target gNB to store at least two UE configuration data sets becomes effective;
such capability may be vendor specific or standardized
Failures due to race condition (see prior art option 3) are avoided.
Target gNB may store necessary UE configuration data sets and may delete UE configuration data sets after they became unnecessary.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

In prior art Option 2, cancelling the CHO in step 5 exposes the UE to the risk of failures, since the UE has no configuration for executing a proper (C)HO to a target cell in case of sudden changes of radio conditions. In addition, the cancellation also creates additional signalling. So, it would be better to have a method where the UE can keep the CHO configuration and thereby remains protected against sudden changes in radio propagation.

Prior art Option 3 results in a race condition. In step 6, the target cell deletes the original UE configuration data set, but UE receives the new CHO configuration only in step 8. If the CHO execution condition expires in between, the UE would attempt to access the target cell with the old CHO configuration which is not known any more by the target gNB. Thus the CHO execution may fail.

Figure 5:
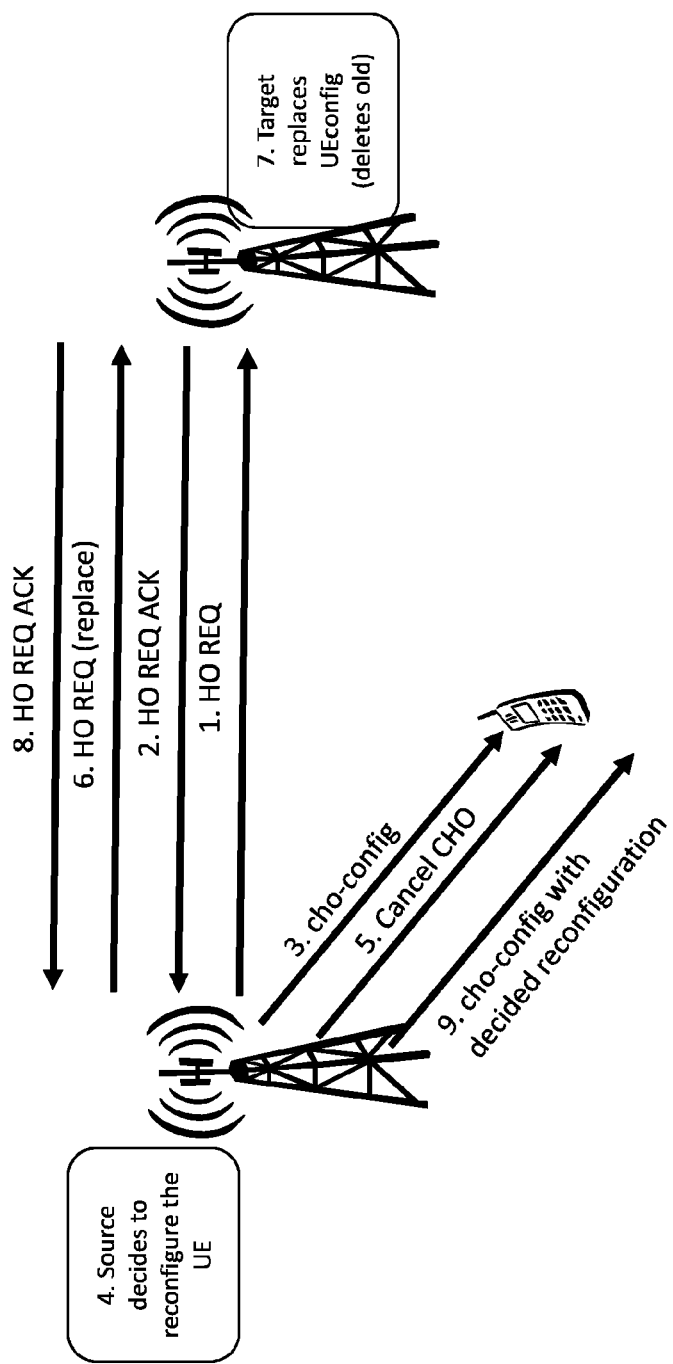
FIG. 5 depicts prior art Option 2: Cancel CHO and re-initiate CHO.
Figure 6:
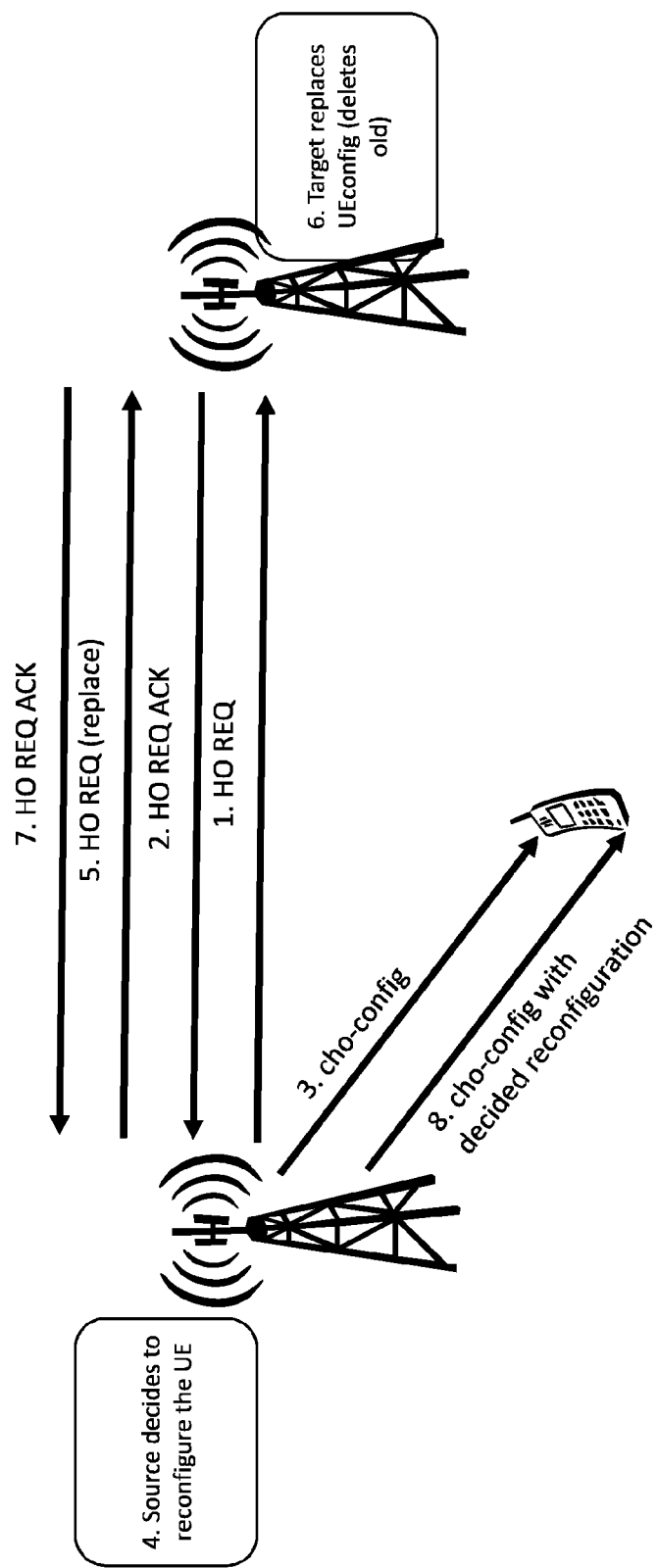
FIG. 6 depicts prior art Option 3: Modifying CHO (via new HO REQ) without cancelling CHO inside UE.

The present inventors observe that, if the prior art option 3a (the target gNB maintaining the old UE configuration data set and the new UE configuration data set) is applied to prior art options 2 and 3, the source gNB should know already in step 4 in FIG. 6 and FIG. 5 (i.e., when the source gNB decides on the RRC reconfiguration) if the target gNB maintains concurrently the old UE configuration data set and the new UE configuration data set. Namely, before the source gNB sends the new Handover Request to modify the UE configuration data set in the target gNB, source gNB has to decide whether or not it sends the CHO cancellation to the UE.

According to some example embodiments of the invention, the source gNB is informed, whether or not the target gNB will keep at least one old UE configuration data set in parallel to (concurrently with) the new UE configuration data set in case of a CHO modification via a new Handover Request message containing information on the configuration of the UE after the decided RRC reconfiguration is performed.

Based on this information, the source gNB may decide, in case the UE has to be reconfigured (potentially with impact on the UE configuration data set stored at target gNB):
to directly send the new Handover Request (containing information on the configuration of the UE after the decided RRC reconfiguration is performed) without cancelling the CHO inside the UE (when the source gNB is informed that the target gNB will keep concurrently the old UE configuration data set and the new UE configuration data set)
to cancel the CHO inside the UE first and then send the new Handover Request (containing information on the configuration of the UE after the decided RRC reconfiguration is performed) to the target cell.

In some example embodiments, the source gNB receives the said information (whether the target gNB will keep at least one old UE configuration data set in case of CHO modification) via the Handover Request Acknowledgement message for the old CHO request (i.e. a response to the Handover Request used to configure the CHO for this target gNB), or via the response to the last modification request for the CHO.

In some example embodiments, the source gNB may obtain said information via other ways, e.g.:
- In a previous gNB Configuration Update from the target gNB;
- In the original Xn Setup procedure or in a reconfiguration procedure of the Xn interface (Xn: interface between source gNB and target gNB);
- From Operation & Maintenance (i.e. via a management interface such as Itf-N).

Figure 7:
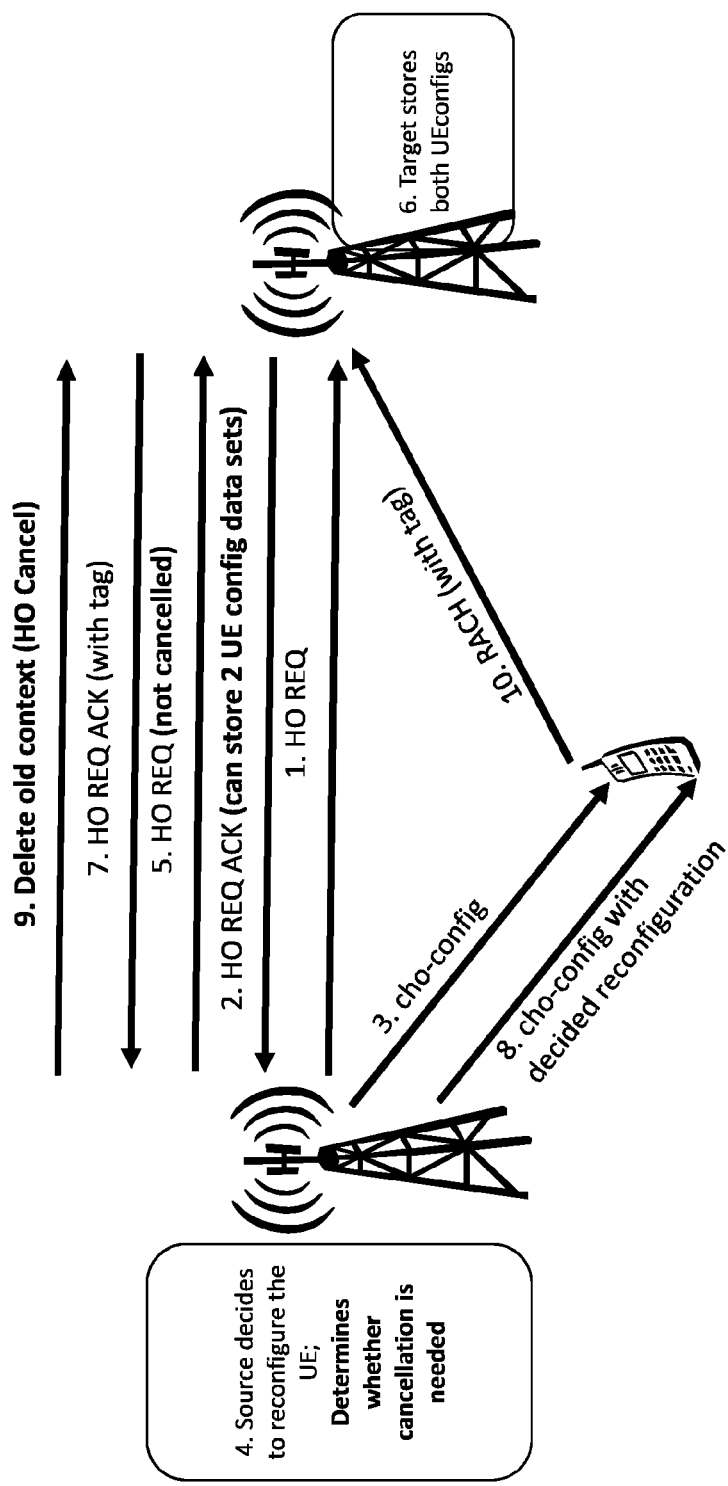
FIG. 7 depicts a method according to some example embodiments of the invention: target gNB indicates whether it will keep the original UE configuration.

In these example embodiments, the source gNB receives the information any time before the source gNB decides to reconfigure the UE (e.g. before step 4 in FIG. 7).

In some example embodiments, the said information may be provided by several means. In such embodiments, there may be a hierarchy of such information. For example, if said information is first received by an O&M command, and later, the information is contained in a gNB configuration update information from the target gNB or in the Xn reconfiguration procedure, the latter overwrites the information of the O&M command. If the said information is received in a CHO REQ ACK, it may have prevalence over all other information received previously for that target gNB.

In the following detailed description, it is assumed that the said information is provided in CHO REQ ACK. If the source gNB receives the said information any time before the source gNB decides to reconfigure the UE (e.g. before step 4 in FIG. 7) in any other way, the rest of the examples and figures remains the same.

FIG. 7 illustrates a method according to some example embodiments of the invention.
1. The CHO starts with source gNB sending a Conditional Handover Request for a UE to the target gNB for a conditional handover. The Conditional Handover Request comprises information on the current UE configuration.
2. The target gNB responds by sending a Handover Request Acknowledgement containing the CHO configuration (cho-config) which has been created by the target gNB based on the information on the UE configuration received from the source gNB. In this message, it may add an information element indicating to the source gNB, whether it will keep/store at least one previous/original UE configuration, in case the CHO is modified later.
3. The source gNB sends the cho-config along with the CHO execution event/condition to the UE in an RRC reconfiguration. The UE will execute the handover when the execution event triggers which may be considerable time later.
4. During this time, Source gNB may decide to reconfigure the UE.
5. The source gNB determines, from the new information element received from the target gNB, whether it has to cancel the CHO in the UE, or whether it may send the Handover Request without canceling the CHO inside the UE. In the example of FIG. 7, since the target gNB informed the source gNB that it is configured to store the old UE configuration data set and the new UE configuration data set concurrently, the source gNB decides not to cancel the CHO inside the UE. It directly modifies the CHO by sending a new Handover Request to the target gNB.
    a. As an option, Handover Request may contain a further information which indicates to the target, whether the CHO was canceled or not. Note, that even if the target gNB has signaled to keep the original UE configuration data set (in step 2), the source gNB is still free to cancel the CHO nevertheless. Sending this information to the target avoids that the target gNB stores the original UE configuration data set unnecessarily.
6. In this example embodiment, the target gNB keeps the original UE configuration data set (since it has committed to do so in step 2, and the source gNB has not indicated that CHO was cancelled). It may also happen that the target gNB is already storing more than one UE configuration data sets (e.g. due to another previous RRC reconfiguration with CHO modification). In this case, the target gNB may either keep all previous UE configuration data sets, or may keep the latest UE configuration data set and delete the former UE configuration data sets.
7. The target gNB sends the Handover Request Acknowledgement to the source gNB (containing the new cho-config). This information contains a tagging of the UE configuration data set in order to identify which of the UE configuration data sets is used in the random access during CHO execution.
8. The source gNB sends to the UE the previously decided RRC reconfiguration along with the new cho-config and the CHO execution event.
9. As an option, once the source gNB determines, that the UE has successfully received the new cho-config (e.g. when the RRC reconfiguration has been acknowledged by the UE), the source gNB may send another information to the target gNB, such that the target gNB may delete the original UE configuration. This avoids that the target gNBs stores the old UE configuration data set unnecessarily. This information may be sent via a new message or using the existing Handover Cancel message (in this case, the target gNB has to recognize that the HO Cancel concerns the old UE configuration data set: for example, a special flag in the HO Cancel message may be used. As another option, the target gNB may delete the old UE configuration data set when it stores more than 1 UE configuration data set for a given UE and target cell).
10. When the execution event triggers the execution of the CHO inside the UE, the UE accesses the target cell using the old UE configuration data set (when this happens before step 8), or the new UE configuration data set (when this happens after step 8). The UE may use the tagging created by the target gNB and provided in the Handover Requests (step 2 and step 7).

Figure 1:
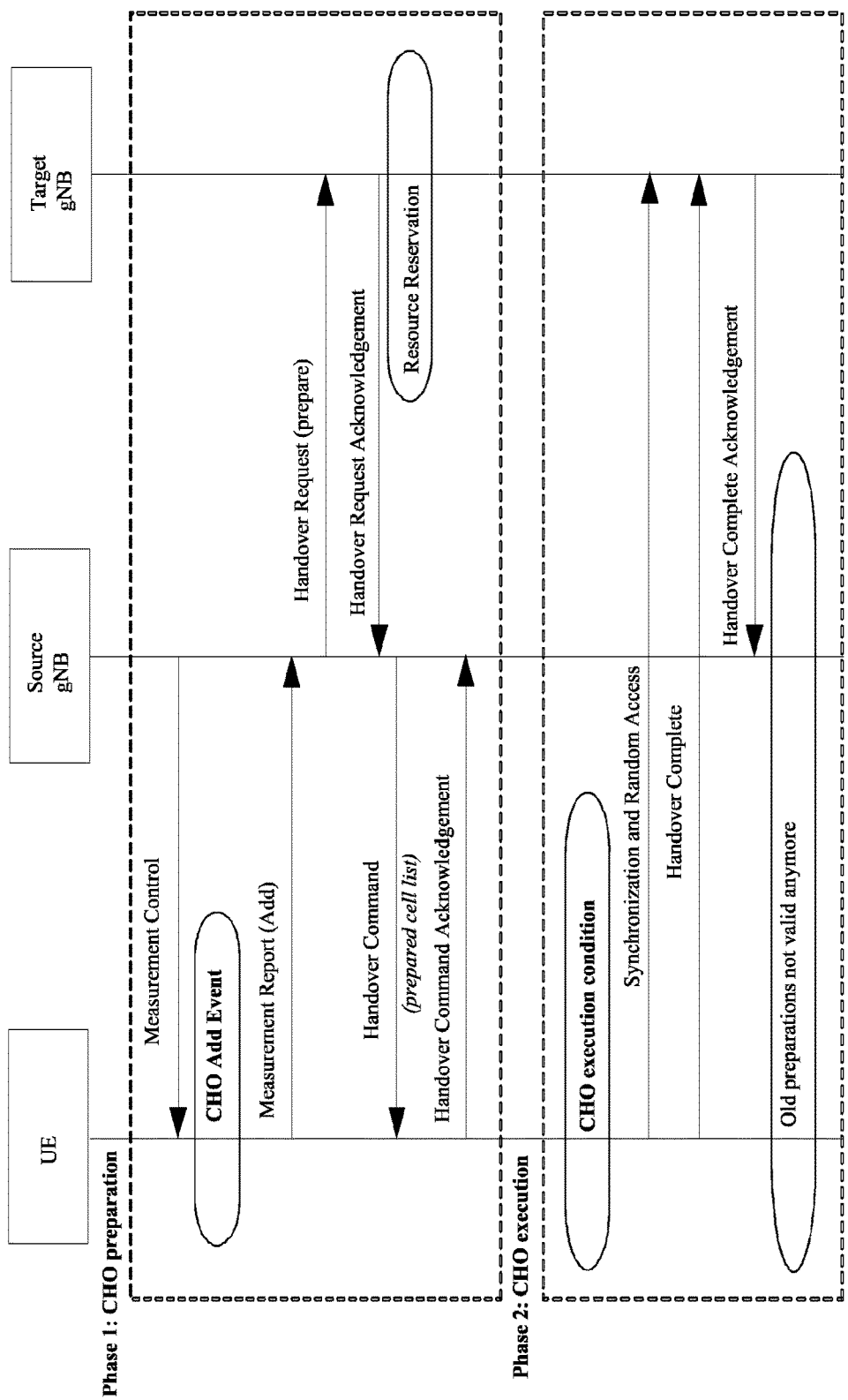
FIG. 1 depicts conditional handover according to the prior art.
Figure 2:
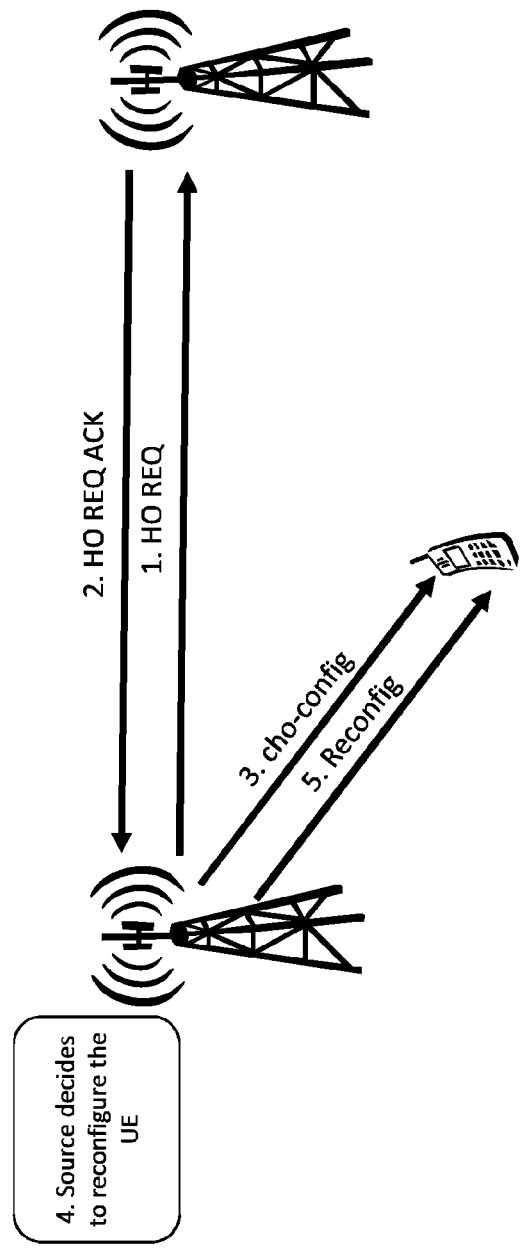
FIG. 2 depicts prior art Option 1: Source gNB directly executes the RRC reconfiguration.
Figure 3:
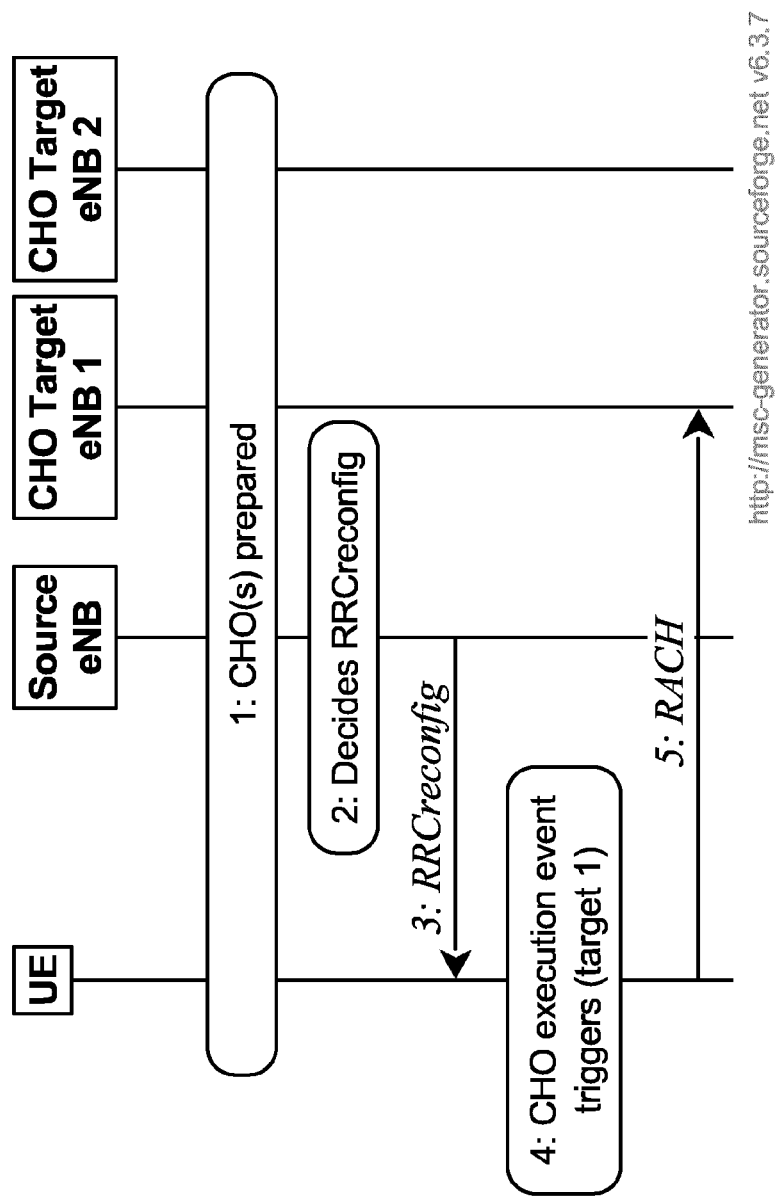
FIG. 3 depicts a message chart according to prior art Option 1.
Figure 8:
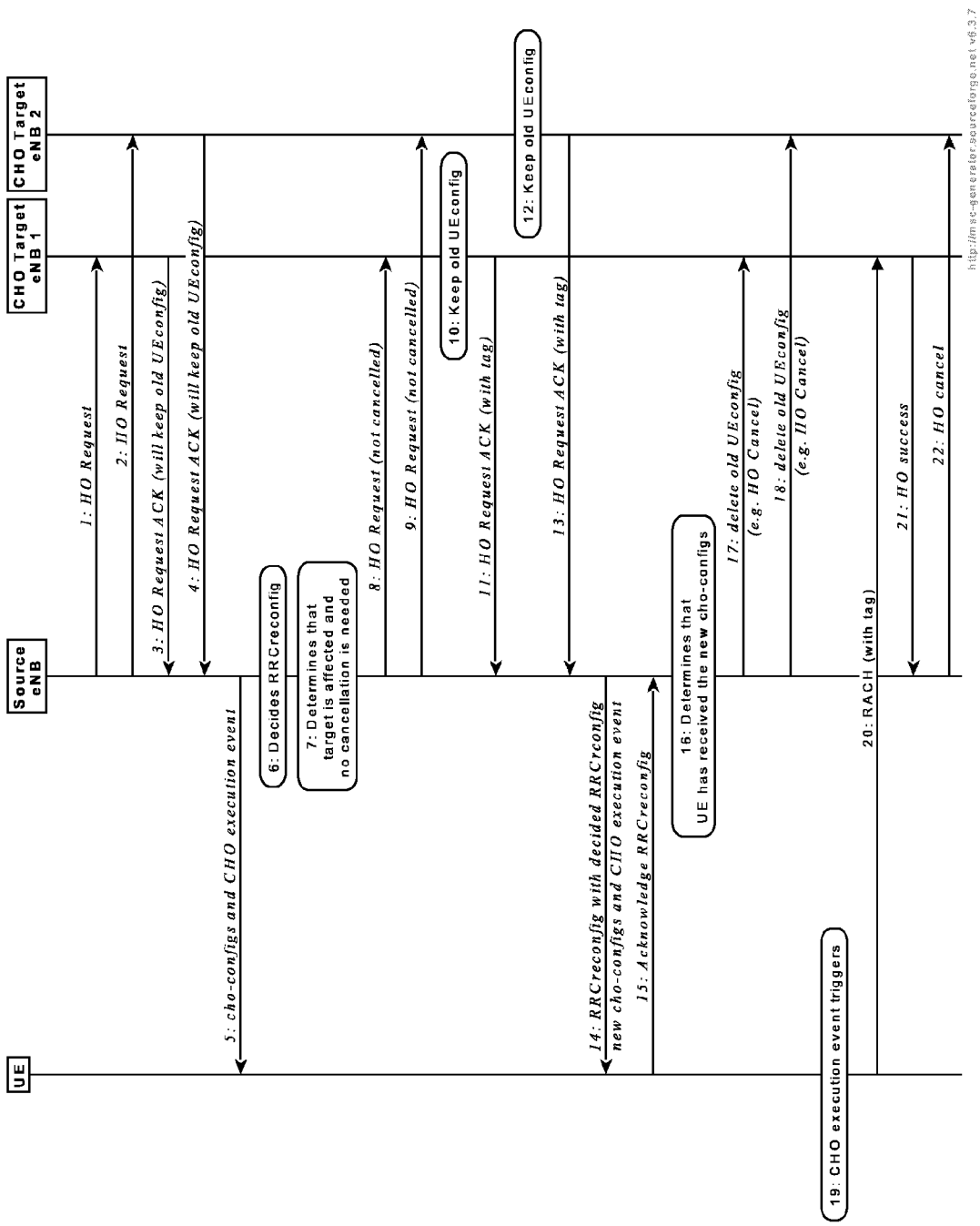
FIG. 8 depicts a message chart according to some example embodiments of the invention.

FIG. 8 shows another message sequence chart according to some example embodiments of the invention. In FIG. 8, plural target cells (here, two target cells eNB1 and eNB2 are shown as an example) have been prepared for a CHO of one UE.
1.+2.: The conditional handovers are prepared via Conditional Handover Request procedure. This may happen simultaneously, or one after the other.
3.+4.: The Conditional Handover Request Acknowledgements contain the indication whether or not the target gNBs will keep old UE configuration data set(s). In the example of FIG. 8, the target gNBs indicate that they will keep at least one old UE configuration data set.
5. The cho-configs are sent to the UE (simultaneously or one by one).
6. Later, but prior to the UE performing the conditional handover, source gNB decides RRC reconfiguration and determines:

Whether the handover to the target cell will be affected (it may also execute the RRC reconfiguration with the UE according to FIG. 2 and FIG. 3). This determination is optional. In some example embodiments, source gNB may not determine if the decided RRC reconfiguration affects the handover to the target cell and may assume for each RRC reconfiguration that it may affect the handover to the target cell.

7. Whether or not cancellation of the CHO inside the UE is needed (depending on the information in the Handover Request Acknowledgement, informing whether or not the target gNB stores at least one old UE configuration data set).

Figure 4:
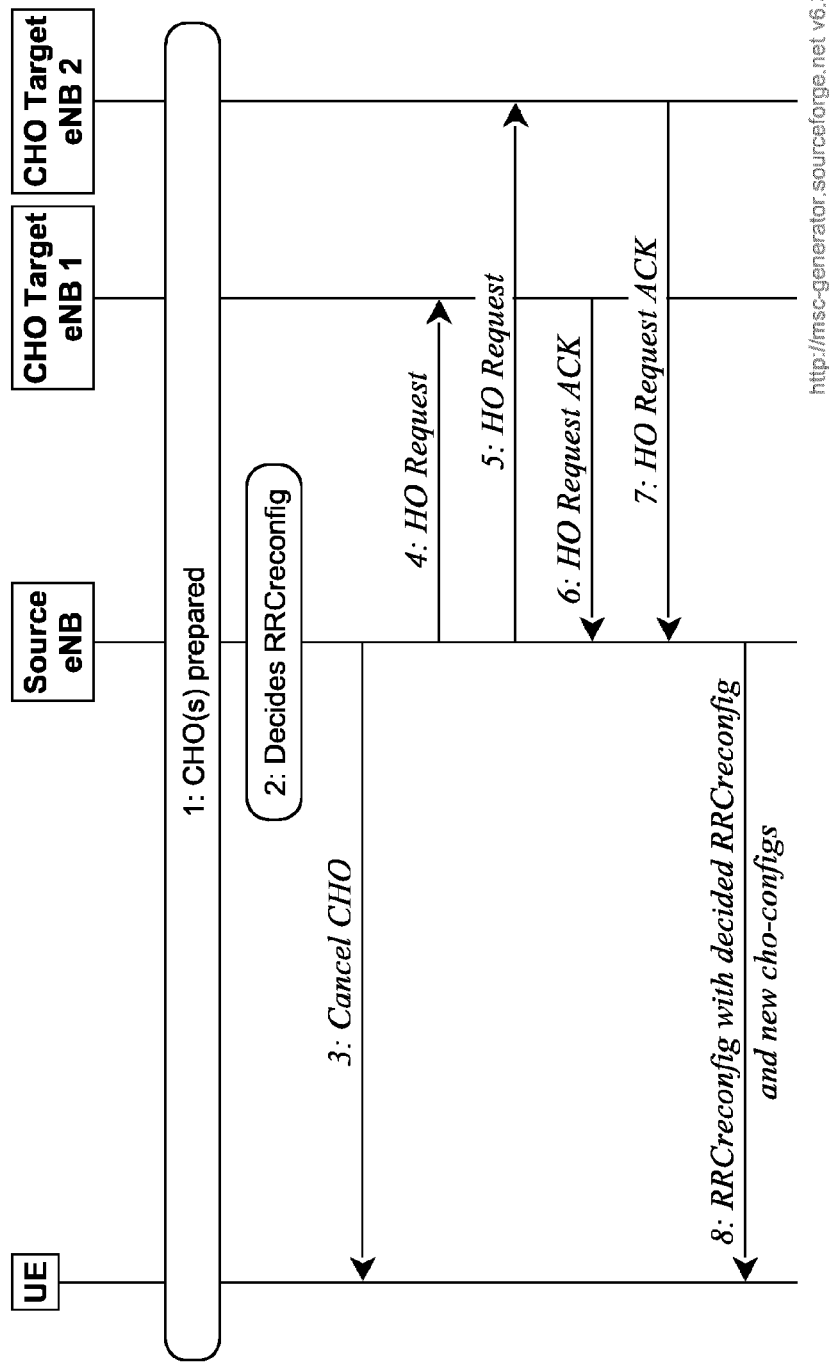
FIG. 4 depicts a message chart according to prior art Option 2.

If cancellation is needed for at least one of the target gNBs (not shown), then source gNB cancels the conditional handover in the UE (according to FIG. 4 and FIG. 5).

8.+9. If cancellation is not needed, the source gNB modifies the CHO Requests by sending new Handover Requests to all target gNBs. The new Handover Requests (CHO Requests) comprise information on the configuration of the UE assuming that the decided RRC reconfiguration has been performed.

These messages may contain the information whether or not the conditional handover was cancelled inside the UE (in the example shown in FIG. 8 it was not cancelled)

10.-13. The target gNBs will derive the new UE configuration data sets based on the information on the UE configuration comprised in the HO requests (if CHO was not cancelled inside the UEs) while keeping the old UE configuration data set and send Handover Request Acknowledgements carrying the new cho-configs including their tags (e.g. C-RNTI, CFRA).

14. The source gNB sends the RRC reconfiguration, including the previously decided RRC reconfiguration, the new cho-configs and the CHO execution events.

15. UE acknowledges receipt of the RRC reconfiguration.

16. The source gNB determines that the UE has successfully received the new cho-configs (based on an acknowledgement from the UE).

17.+18. The source gNB sends information to the target gNBs that the old UE configuration data set can be deleted, e.g. a Handover Cancel message.

19.+20. When the CHO execution event triggers CHO to one of the target cells, the UE accesses this target cell using the tag created by this target cell.

21. For the sake of completeness, the target gNB may send Handover Success to the source gNB (such that the source can start packet forwarding).

22. The source gNB may cancel the CHO in the other target gNBs.

In contrast to [7], according to some example embodiments of the invention, a categorization of the RRC reconfigurations is not needed. In particular, the target cell does not do a categorization. It also does not define a set of actions for the source gNB. It informs that the source node about its own behavior (whether or not it stores at least one old UE configuration data set). This information and the behaviour of the source gNB based on this information may be independent from any type of RRC reconfiguration.

If some example embodiments of the invention become standardized, they may affect the X2/Xn specifications (3GPP TS 36.423, 38.423) and also the stage 2 description (3GPP TS 38.300, 36.300, 37.340) as follows:

In particular, the Handover Request Acknowledgement is extended by an information element indicating whether the target will store an old UE configuration data set In addition, the Handover Request message might be extended by an information element, indicating whether a CHO has been canceled or not (if the HO REQ is a modification/replacement of a CHO).

Furthermore, an information may be sent from source gNB to target gNB such that the target may delete old UE configurations, e.g. via Handover Cancel.

Figure 10:
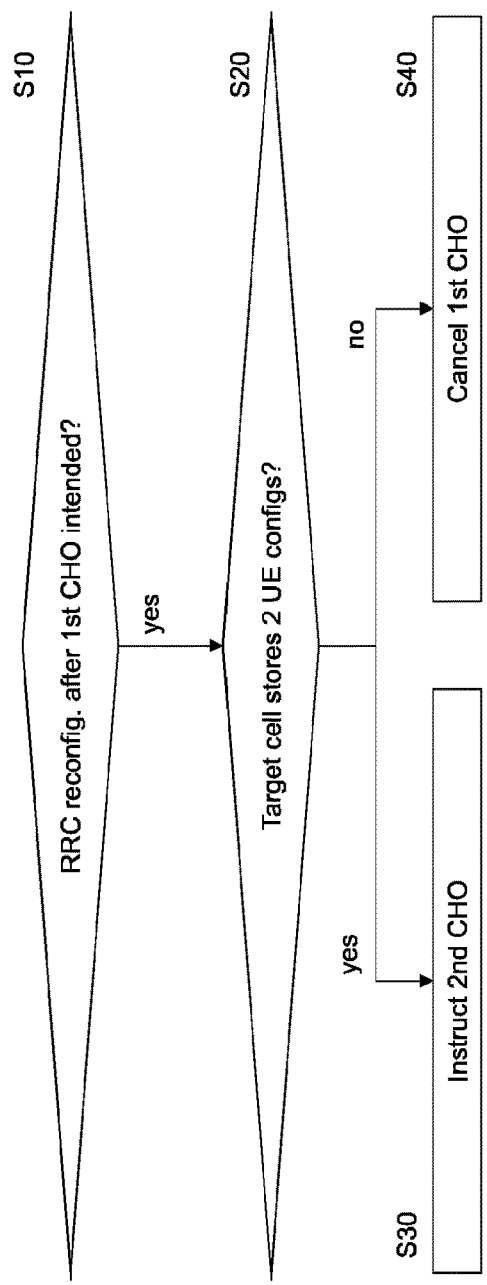
FIG. 10 shows a method according to an example embodiment of the invention.
Figure 9:
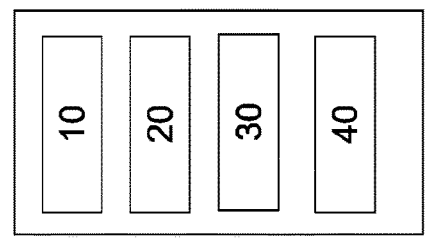
FIG. 9 shows an apparatus according to an example embodiment of the invention.

FIG. 9 shows an apparatus according to an embodiment of the invention. The apparatus may be a cell such as a source cell or a corresponding base station, or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises means for monitoring 10, means for checking 20, means for canceling 30, and means for instructing 40. The means for monitoring 10, means for checking 20, means for canceling 30, and means for instructing 40 may be a monitoring means, checking means, canceling means, and instructing means, respectively. The means for monitoring 10, means for checking 20, means for canceling 30, and means for instructing 40 may be a monitor, checker, canceller, and instructor, respectively. The means for monitoring 10, means for checking 20, means for canceling 30, and means for instructing 10 may be a monitoring processor, checking processor, canceling processor, and instructing processor, respectively.

The means for monitoring 10 monitors if the source cell intends performing a radio reconfiguration of the terminal from a first configuration to a second configuration after the source cell configured the terminal for a first conditional handover (S10).

The means for checking 20 checks if an indication indicates that a target cell is configured to store concurrently a first configuration data set of a terminal and a second configuration data set of the terminal (S20). The first configuration data set is based on information on the first configuration of the terminal contained in the first conditional handover request for the terminal from the source cell to the target cell. The second configuration data set is based on information on the second configuration of the terminal contained in a second conditional handover request for the terminal from the source cell to the target cell.

In the present application, the expression "the target cell is configured to store concurrently a first configuration data set of a terminal and a second configuration data set of the terminal" includes that the target cell is capable of storing both configuration data sets from a performance point of view.

S10 and S20 may be performed in any arbitrary sequence. They may be performed fully or partly in parallel.

If the source cell intends performing the radio reconfiguration (S10=yes) and the indication does not indicate that the target cell is configured to store concurrently the first configuration data set and the second configuration data set (S20=no), the means for cancelling 40 cancels the first conditional handover in the terminal (S40). After the cancelling, the means for instructing 30 may instruct the source cell to request the second conditional handover from the target cell.

If the source cell intends performing the radio reconfiguration (S10=yes) and the indication indicates that the target cell is configured to store concurrently the first configuration and the second configuration (S20=yes), the means for instructing 30 instructs the source cell to request the second conditional handover from the target cell (S30). It may or may not cancel the first conditional handover in the terminal.

Figure 12:
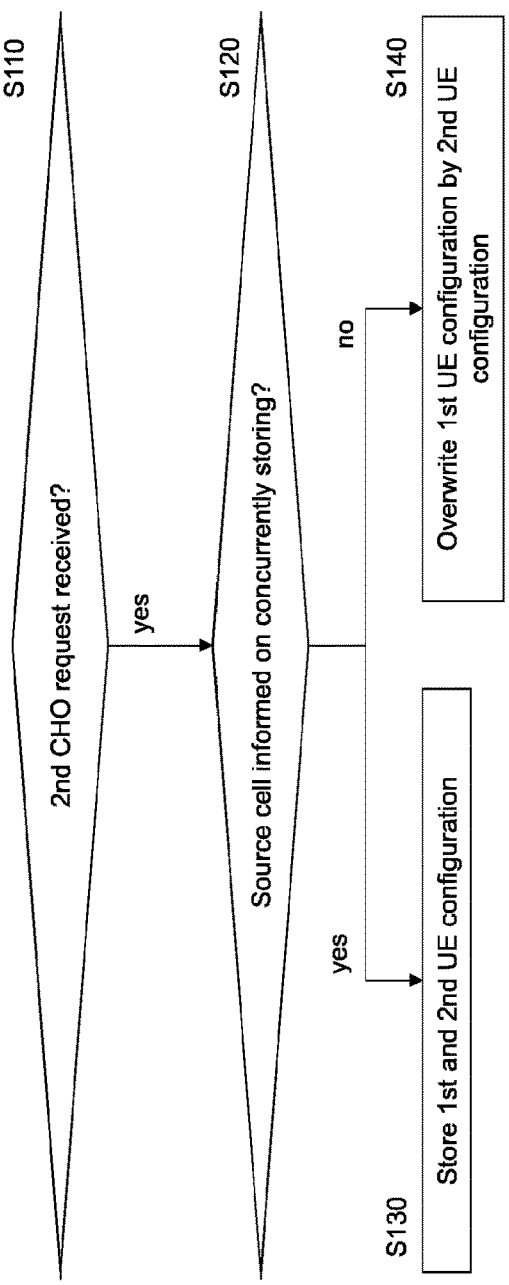
FIG. 12 shows a method according to an example embodiment of the invention.
Figure 11:
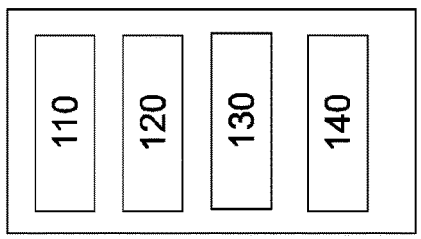
FIG. 11 shows an apparatus according to an example embodiment of the invention.

FIG. 11 shows an apparatus according to an embodiment of the invention. The apparatus may be a cell such as a target cell or a corresponding base station, or an element thereof. FIG. 12 shows a method according to an embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises means for monitoring 110, means for checking 120, means for storing 130, and means for overwriting 140. The means for monitoring 110, means for checking 120, means for storing 130, and means for overwriting 140 may be a monitoring means, checking means, storing means, and overwriting means, respectively. The means for monitoring 110, means for checking 120, means for storing 130, and means for overwriting 140 may be a monitor, checker, storage device, and overwriter, respectively. The means for monitoring 110, means for checking 120, means for storing 130, and means for overwriting 140 may be a monitoring processor, checking processor, storing processor, and overwriting processor, respectively.

The means for monitoring 110 monitors if a second conditional handover request for a terminal is received after a first conditional handover request for the terminal has been received (S110).

The means for checking 120 checks if a source cell is informed that a target cell is configured to store concurrently a first configuration data set of the terminal and a second configuration data set of the terminal (S120). The first configuration data set is based on information on a first configuration of the terminal contained in the first conditional handover request for the terminal from the source cell to the target cell. The second configuration data set is based on information on a second configuration of the terminal contained in the second conditional handover request for the terminal from the source cell to the target cell.

In the present application, the expression "the target cell is configured to store concurrently a first configuration data set of a terminal and a second configuration data set of the terminal" includes that the target cell is capable of storing both configuration data sets from a performance point of view.

S110 and S120 may be performed in any arbitrary sequence. They may be performed fully or partly in parallel.

If the source cell is informed that the target cell is configured to store concurrently the first configuration data set and the second configuration data set (S120=yes) and the second conditional handover request is received after the first conditional handover request has been received (S110=yes), the means for storing 130 stores the second configuration data set concurrently with the first configuration data set (S130).

In some example embodiments, if the source cell indicates that it cancelled the CHO in the UE, the means for storing 130 may be inhibited to store the second configuration data set concurrently with the first configuration data set even if the source cell is informed that the target cell is configured to store concurrently the first configuration data set and the second configuration data set. In this case, the means for informing 140 may overwrite the stored first configuration data set by the second configuration data set.

If the source cell is not informed that the target cell is configured to store concurrently the first configuration data set and the second configuration data set (S120=no) and the second conditional handover request is received after the first conditional handover request has been received (S110=yes), the means for overwriting 140 overwrites the stored first configuration data set by the second configuration data set (S140).

Figure 13:
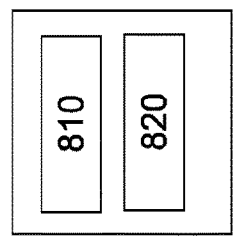
FIG. 13 shows an apparatus according to an example embodiment of the invention.

FIG. 13 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 10 and 12.

Hereinabove, some example embodiments are described wherein the source gNB sends a first CHO request ad a second CHO request for the terminal to the target cell. The source cell may send a modification command to modify the first CHO request. The modification command contains the information on the UE configuration, too. The modification command may be considered as a second CHO request.

A CHO request and a CHO request acknowledgment may look the same as a HO request and a HO request acknowledgment.

Embodiments of the invention are described for 5G networks. However, the invention is not restricted to 5G networks and may be employed in other 3GPP networks such as 3G networks, 4G networks, and upcoming 3GPP releases, too. The invention may be employed in non-3GPP networks provided they comprise a function corresponding to a conditional handover.

A UE is an example of a terminal. Other examples of terminals are e.g. a MTC device. The terminal is selected according to the respective network.

A cell may be represented by its base station, e.g. eNB or gNB. If not otherwise indicated or made clear from the context, the terms "cell" and "base station" are used synonymously in the present application.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a cell or a base station embodying the cell, such as a gNB or eNB, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
one or more processors, and
memory storing instructions that, when executed by the one or more processors, cause the apparatus to
check if an indication indicates that a target cell is configured to store concurrently a first configuration data set of a terminal and a second configuration data set of the terminal, wherein the first configuration data set is based on information on a first configuration of the terminal contained in a first conditional handover request for the terminal from a source cell to the target cell, and the second configuration data set is based on information on a second configuration of the terminal contained in a second conditional handover request for the terminal from the source cell to the target cell;
monitor if the source cell intends performing a radio reconfiguration of the terminal from the first configuration to the second configuration after the source cell configured the terminal for the first conditional handover;
cancel the first conditional handover in the terminal if the source cell intends performing the radio reconfiguration and the indication does not indicate that the target cell is configured to store concurrently the first configuration data set and the second configuration data set; and
instruct the source cell to request the second conditional handover from the target cell if the source cell intends performing the radio reconfiguration and the indication indicates that the target cell is configured to store concurrently the first configuration and the second configuration,
wherein the indication is received in a response to the first conditional handover request,
wherein the indication is received in at least one of an information on a configuration update of the target cell, a setup or reconfiguration procedure of an interface between the source cell and the target cell, and in an operation and maintenance command,
wherein the memory and instructions, when executed on the one or more processors, cause the apparatus to
observe if an acknowledgment is received from the terminal in response to performing the radio reconfiguration of the terminal after the terminal was configured for the second conditional handover to the target cell; and
inform the target cell, if the acknowledgement is received, that the terminal was successfully reconfigured after the terminal was configured for the second conditional handover to the target cell.

2. The apparatus according to claim 1, wherein the instructing comprises instructing the source cell to notify the target cell whether or not the first conditional handover has been cancelled in the terminal if the first conditional handover has been cancelled in the terminal.

3. The apparatus according to claim 2, wherein
the instructing comprises instructing the source cell to request the second conditional handover from the target cell if the source cell intends performing the radio reconfiguration and the first conditional handover has been cancelled in the terminal.

4. The apparatus according to claim 3, wherein the memory and instructions, when executed on the one or more processors, cause the apparatus to
inhibit cancelling the first conditional handover in the terminal if the source cell intends performing the radio reconfiguration and the indication indicates that the target cell is configured to store concurrently the first configuration and the second configuration.

5. An apparatus, comprising:
one or more processors, and
a memory storing instructions that, when executed by the one or more processors, cause the apparatus to
check if a source cell is informed that a target cell is configured to store concurrently a first configuration data set of a terminal and a second configuration data set of the terminal, wherein the first configuration data set is based on information on a first configuration of the terminal contained in a first conditional handover request for the terminal from the source cell to the target cell, and the second configuration data set is based on information on a second configuration of the terminal contained in a second conditional handover request for the terminal from the source cell to the target cell;
monitor if the second conditional handover request for the terminal is received after the first conditional handover request for the terminal has been received;
store the second configuration data set concurrently with the first configuration data set if the source cell is informed that the target cell is configured to store concurrently the first configuration data set and the second configuration data set and the second conditional handover request is received after the first conditional handover request has been received; and
overwrite the stored first configuration data set by the second configuration data set if the source cell is not informed that the target cell is configured to store concurrently the first configuration data set and the second configuration data set and the second conditional handover request is received after the first conditional handover request has been received,
wherein the memory and instructions, when executed on the one or more processors, cause the apparatus to
inform the source cell that the target cell is configured to store concurrently the first configuration data set and the second configuration data set by a first indication in response to the received first conditional handover request; wherein
the checking comprises determining that the source cell is informed if the source cell is informed by the first indication, and wherein the memory and instructions, when executed on the one or more processors, cause the apparatus to inform the source cell that the target cell is configured to store concurrently the first configuration data set and the second configuration data set by a second indication in at least one of a configuration update message of the target cell to the source cell, a setup of an interface between the target cell and the source cell, and a reconfiguration procedure of the interface, and wherein the checking comprises determining that the source cell is informed if the source cell is informed by the second indication.

6. The apparatus according to claim 5, wherein the checking is preconfigured by an operation and maintenance command to determine that the source cell is informed.

7. The apparatus according to claim 6, wherein the memory and instructions, when executed on the one or more processors, cause the apparatus to supervise if a reconfiguration information is received after the second conditional handover request for the terminal, wherein the reconfiguration information informs that the terminal is successfully configured with the second configuration; and delete the first configuration data set if the reconfiguration information is received.

8. The apparatus according to claim 7, wherein the memory and instructions, when executed on the one or more processors, cause the apparatus to determine if a notification is received that that first conditional handover request has been cancelled in the terminal; and inhibit the storing of the second configuration data set concurrently with the first configuration data set if the notification is received; wherein the overwriting comprises overwriting the stored first configuration data set by the second configuration data set if the notification is received and the second conditional handover request is received after the first conditional handover request has been received.

9. A method carried out by an apparatus in a source base station, comprising:

checking if an indication indicates that a target cell is configured to store concurrently a first configuration data set of a terminal and a second configuration data set of the terminal, wherein the first configuration data set is based on information on a first configuration of the terminal contained in a first conditional handover request for the terminal from a source cell to the target cell, and the second configuration data set is based on information on a second configuration of the terminal contained in a second conditional handover request for the terminal from the source cell to the target cell;

monitoring if the source cell intends performing a radio reconfiguration of the terminal from the first configuration to the second configuration after the source cell configured the terminal for the first conditional handover;

canceling the first conditional handover in the terminal if the source cell intends performing the radio reconfiguration and the indication does not indicate that the target cell is configured to store concurrently the first configuration data set and the second configuration data set; and instructing the source cell to request the second conditional handover from the target cell if the source cell intends performing the radio reconfiguration and the indication indicates that the target cell is configured to store concurrently the first configuration and the second configuration, wherein the indication is received in a response to the first conditional handover request, wherein the indication is received in at least one of an information on a configuration update of the target cell, a setup or reconfiguration procedure of an interface between the source cell and the target cell, and in an operation and maintenance command, the method further comprising:

observing if an acknowledgment is received from the terminal in response to performing the radio reconfiguration of the terminal after the terminal was configured for the second conditional handover to the target cell; and informing the target cell, if the acknowledgement is received, that the terminal was successfully reconfigured after the terminal was configured for the second conditional handover to the target cell.

10. The method according to claim 9, wherein the instructing comprises instructing the source cell to notify the target cell whether or not the first conditional handover has been cancelled in the terminal if the first conditional handover has been cancelled in the terminal.

11. The method according to claim 10, wherein the instructing comprises instructing the source cell to request the second conditional handover from the target cell if the source cell intends performing the radio reconfiguration and the first conditional handover has been cancelled in the terminal.

12. The method according to claim 11, further comprising inhibiting cancelling the first conditional handover in the terminal if the source cell intends performing the radio reconfiguration and the indication indicates that the target cell is configured to store concurrently the first configuration and the second configuration.

* * * * *